United States Patent [19]

Takahashi et al.

[11] Patent Number: 4,808,097
[45] Date of Patent: Feb. 28, 1989

[54] APPARATUS FOR MANUFACTURING SHORT INORGANIC FIBERS

[75] Inventors: Tsuyoshi Takahashi; Souichi Adachi, both of Tokyo, Japan

[73] Assignee: Sanei-Kisetsu Co., Ltd., Tokyo, Japan

[21] Appl. No.: 5,704

[22] Filed: Jan. 21, 1987

[30] Foreign Application Priority Data

Jan. 22, 1986 [JP] Japan .................................. 61-11628

[51] Int. Cl.⁴ .............................................. B22D 11/01
[52] U.S. Cl. ............................................ 425/8; 264/8; 264/12; 264/13
[58] Field of Search ............... 425/7, 8; 264/8, 12, 264/13; 65/14, 15; 75/5 C

[56] References Cited

U.S. PATENT DOCUMENTS

| | | | |
|---|---|---|---|
| 3,031,717 | 5/1962 | Levecque et al. ........................ | 65/6 |
| 3,285,722 | 11/1966 | Levecque et al. ...................... | 425/7 |
| 3,312,537 | 4/1967 | Jewell .................................. | 29/183.5 |
| 3,336,125 | 8/1967 | Schachter ............................... | 65/14 |
| 4,348,216 | 9/1982 | Bhatti et al. ............................ | 65/1 |
| 4,382,811 | 5/1983 | Luescher et al. ................ | 65/374.11 |
| 4,511,383 | 4/1985 | Bhatti ..................................... | 65/14 |

OTHER PUBLICATIONS

Soviet Inventions Illustrated, Week C 12 4/30/80.
Soviet Inventions Illustrated, Week 8405 3/14/84.

*Primary Examiner*—Bernard Nozick
*Attorney, Agent, or Firm*—Flynn, Thiel, Boutell & Tanis

[57] ABSTRACT

An apparatus for manufacturing short inorganic fibers is disclosed. A molten inorganic raw material is supplied to a rotating rotor which rotates at high speed. A gas stream delivery port jets a gas stream in surrounding with the rotating rotor. That surface of the rotating rotor which is in direct contact with a melt is formed with a deposited layer of high temperature, erosion resistant coating material.

3 Claims, 2 Drawing Sheets

APPARATUS FOR MANUFACTURING SHORT INORGANIC FIBERS

BACKGROUND OF THE INVENTION

The invention relates to an apparatus for manufacturing short inorganic fibers such as glass wool, rock wool, ceramic wool which utilizes the centrifugal force of a rotation rotor and a gas stream.

An apparatus for manufacturing short inorganic fibers is generally provided with a rotating rotor and an delivery port which supplies a gas stream. The rotating rotor comprises a hollow cylindrical portion which defines a sidewall in which a number of apertures are formed therein to extend therethrough, a bottom which is integrally coupled to the lower end of the cylindrical portion, and a projecting portion which projects a melt radially inward from the upper end of the cylindrical portion around its full perimeter. A rotary shaft is connected to the bottom of the rotating rotor at its center and is adapted to be driven for rotation at a high speed.

A molten inorganic material is supplied into the rotating rotor and is subject to rotation therein so as to be externally thrown away through the apertures.

The delivery port for a gas stream is fixedly mounted adjacent to and above the cylindrical portion of the rotating rotor in an annular configuration so that the melt driven through the apertures in the rotating rotor under the influence of centrifugal force are blown away by a gas stream. One of problems which is experienced during the manufacture of short inorganic fibers such as glass wool, rock wool, ceramic wool with an apparatus as described relates to the erosion of the rotating rotor which occurs as a result of direct contact of the melt therewith, and oxidation caused by hot gas. The melt of a raw material which is supplied to the rotating rotor normally exhibits high temperatures above 1,000° C. Accordingly, as the surface of the rotating rotor is eroded by contact of the melt therewith, the useful life of the rotating rotor is greatly reduced. Another problem relates to the apertures which is caused by continuous passing of the melt therethrough. Specifically, the internal diameter of these apertures tend to increase gradually as a result of the erosion.

To increase the useful life of the rotating, rotor, to stabilize the operation and to achieve a uniform quality of resulting short inorganic fibers, a normal practice is to employ an air cooling or a water cooling of the rotary shaft and the interior of the rotating rotor. However, even if the rotating rotor is subject to a cooling action, the useful life of the rotating rotor is normally on the order of 100 to 200 hours at most. Thus the rotating rotor must be frequently replaced, causing an increased cost and accompanying downtime of the entire apparatus for re-setting. Finally, there is a problem that the diameter of short inorganic fibers which are obtained as a product gradually increases with time.

In an arrangement of another type which is not provided with apertures, that is, where a cylindrical rotating rotor has its axis of rotation disposed horizontally and a molten inorganic material is supplied to the outer surface of the cylindrical portion of the rotating rotor by a free fall to convert it into fibers, the melt supplied is deposited on the cylindrical surface and undergoes a rotation together with the rotating rotor and is then blown away by a gas stream. Consequently, with time during which the rotating rotor is operatively used, the cylindrical surface of the rotating rotor which is disposed for contact with the melt becomes gradually eroded into an uneven configuration to cause an insufficient adhesion of the melt to the rotating rotor, thereby causing a more non-uniform distribution of diameters of fibers and an increased content of non-fiberized particles, thus degrading the fiber quality as a product.

SUMMARY OF THE INVENTION

Accordingly, it is an object of the invention to provide an apparatus for manufacturing short inorganic fibers which permits a rotating rotor to be used over a prolonged period of time without causing any inoperable condition thereof.

It is another object of the invention to prevent a degradation in the quality of short inorganic fibers manufactured with time.

Such objects are accomplished in accordance with the invention by coating the surface of a rotating rotor which is subject to direct contact with a melt with a layer of a high temperature, erosion resistant material.

DESCRIPTION OF SEVERAL EMBODIMENTS

Several embodiments of the invention will now be described with reference to the drawings. Initially, the basic arrangement of an apparatus and the use of the apparatus for manufacturing short inorganic fibers such as glass wool, rock wool, ceramic wool will be described with reference to FIG. 3. In this Figure, a rotary shaft 1 is disposed vertically and is adapted to be driven in a direction indicated by an arrow, by a drive source, not shown. It is to be understood that the rotary shaft 1 may also be disposed in a horizontal position or in an inclined position.

Figure 2:
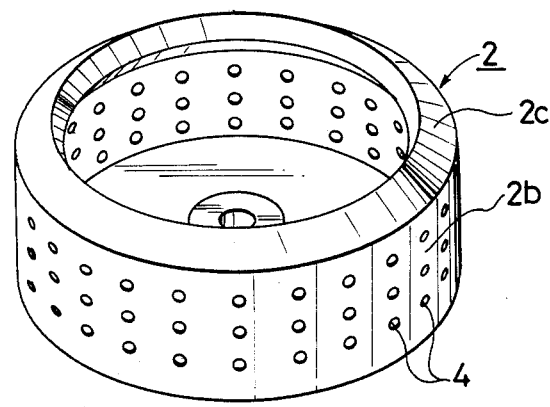
FIG. 2 is a perspective view of the rotating rotor shown in FIG. 1 as well as in FIG. 3, illustrating the appearance thereof.

A rotating rotor 2 is detachably mounted on the rotary shaft 1 and integrally connected thereto for rotation at a high speed. The appearance of the rotating rotor 2 is shown in FIG. 2 where it will be seen that it comprises a cylindrical portion 2b, a bottom 2a which is integrally connected on the lower end of the cylindrical portion 2b, and a projecting portion 2c which projects a melt radially inward from the top end of the cylindrical portion 2b around its full perimeter, the projecting portion defining part of the cylindrical portion 2b. The rotary shaft 1 is connected to the bottom 2a of the rotating rotor 2 at its center. The purpose of the projecting portion 2c is to define a reservoir for the melt which is supplied into the interior of the rotating rotor 2 rather than allowing them to be discharged under the influence of the centrifugal force. While the arrangement shown includes a single rotating rotor 2 mounted on a single rotary shaft 1, it should be understood that a plurality of rotating rotors 2 may be mounted on the corresponding plurality of rotary shafts 1. A number of apertures 4 are formed to extend through the sidewall, defined by the cylindrical portion 2b, of the rotating rotor 2 over the entire periphery thereof. As shown in FIG. 2, these apertures are regularly disposed in a plurality of tiers, but an irregular array of apertures may also be used. Usually, each of the apertures 4 has a diameter from 0.2 to 1.2 mm.

An annular gas stream delivery port 3 is fixedly mounted close to the outer periphery of the rotating rotor 2 and above the apertures 4 formed in the cylindrical portion 2b thereof. The gas stream delivery port 3 jets a hot and high speed gas or a high speed gas alone in an annular configuration concentric with the rotating rotor 2, thereby blowing the melt away as it is driven through the apertures 4 under the influence of the centrifugal force.

By way of illustration, the manufacture of short inorganic fibers such as glass wool using the described apparatus will be described. Initially, an inorganic raw material comprising starting materials which are blended together to provide a given composition of the fiber is melted by heating it to elevated temperatures as in an electric furnace to provide a melt 5. The melt 5 is then supplied into the interior of the rotating rotor 2 which rotates at a high speed, as indicated by an arrow A shown in FIG. 3. The melt 5 is then subject to the influence of the centrifugal force as it rotates together with the rotating rotor 2 while it is retained in an internal space defined by the bottom 2a, the cylindrical portion 2b and the projecting portion 2c. The centrifugal force causes the melt 5 to be driven through the apertures 4 formed in the cylindrical portion 2b so as to be extruded into thread configuration toward the exterior. At this time, an annular gas stream B with a high speed is jetted downward from the delivery port 3 in surrounding with the rotating rotor 2, so that as the melt 5 in the form of threads are blown in the outward direction, it is dispersed and stretched by the gas stream B, whereby short inorganic fibers 7 in the form of thin fibers are manufactured.

Figure 1:
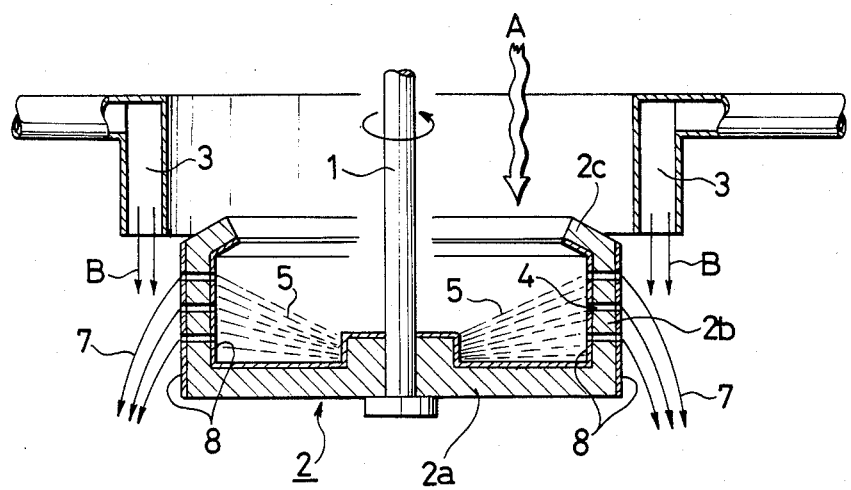
FIG. 1 is a longitudinal section of an apparatus for manufacturing short inorganic fibers according to one embodiment of the invention, illustrating a rotating rotor, the surface of which is coated by a deposited layer.

Referring to FIG. 1, there is shown a similar apparatus as mentioned above, but in which the rotating rotor 2 is coated by a deposited layer. As shown, portions of the surface of the rotating rotor 2 which are subject to direct contact with the melt 5, namely, the inner surface of the bottom 2a, both the inner and the outer surface of the cylindrical portion 2b and the inner surface of the projecting portion 2c, are provided with a deposited layer 8. While not shown, it is preferred that the inner surface of the aperture 4 is also coated with a similar deposited layer 8. The deposited layer 8 comprises at least one of high temperature, erosion resistant materials including metals, ceramics or metal-ceramics composite, which are spray coated on the surface in a single layer or a plurality of layers.

Such coating materials include nickel, chromium, aluminium, molybdenum, niobium, or cobalt either alone or in alloyed form; oxides, carbides or nitrides of tungsten, zirconium, boron, silicon, aluminium, magnesium or titanium either alone or in mixture or as a composite with metals. Metals, ceramics and metal-ceramics composite may be used alone, but it is also possible to use them in any desired combination in admixture.

When spray coating the surface of the rotating rotor 2 with the described high temperature, erosion resistant material, which may be either alone or in admixture, a single layer or multiple layers may be formed. To remove thermal strains substantially which occur between the rotating rotor 2 and the deposited layer 8 during the heating and cooling cycle in operation, it is desirable that the substrate or base layer which is in direct contact with the surface of the rotating rotor is formed of a layer comprising either metal or a metal-ceramics composite and that an intermediate layer and/or top layer is formed of a metal-ceramics composite or a ceramics layer. When the intermediate and the top layer essentially comprises ceramics material, a heat insulating layer is defined by a material having a low thermal conductivity, thereby preventing the heat of the melt from being directly transferred to the rotating rotor 2. In other words, a temperature lowering effect upon the rotating rotor 2 can be expected by the use of such heat insulating layer. This will be manifest as an improved useful life of the rotating rotor 2.

By way of example, when the deposited layer 8 comprises two layers, including a base layer and a top layer, the base layer is formed of either a metal or a metal-ceramics composite material while the top layer may be formed with either a metal-ceramics composite material or a ceramics material.

Where three or more layers are deposited, for example, where the deposited layer 8 comprises a base layer, an intermediate layer and a top layer, the base layer which is located nearest the surface of the rotating rotor is formed of either a metal or metal-ceramics composite, the intermediate layer is formed of either metal-ceramics composite or ceramics, and the top layer is formed of metal-ceramics composite or ceramics. In addition, where a plurality of intermediate layers are deposited, each of them may be formed of either metal-ceramics composite or ceramics. It is to be understood that each layer which is used to define the base layer or the intermediate layer as well as the top layer may be formed of any desired coating material including a metal, ceramics and metal-ceramics composite.

The high temperature, erosion resistant material can be spray coated on the surface of the rotating rotor 2 by a plasma spraying process in which inorganic material is melted and travelled by a hot and high speed plasma stream and, at a sonic, supersonic or subsonic speed, molten particles are impinged upon the surface of the rotating rotor to be deposited, by a detonation process or similar process. The deposited layer 8 which is spray coated should have a thickness equal to or greater than 70 $\mu$ (micron) to achieve its effectiveness in increasing the useful life of the rotating rotor 2, but it is more preferred that the thickness is in excess of 300 $\mu$ in order to provide a remarkable effect.

The invention will be more specifically described with reference to FIG. 1 on the basis of experimental results obtained by the inventor. "First fiberizing unit" is prepared by forming the rotating rotor 2 shown in FIG. 1 with nickel-chromium steel of a high temperature, erosion resistant type (without deposited layer 8) so as to have a diameter of 250 mm, a height 100 mm and a wall thickness 10 mm, and by mounting it on the vertical rotary shaft 1. "Second fiberizing unit" is similarly prepared by mounting on the vertical rotary shaft 1 the rotating rotor 2 which is the same as that described above for the "first fiberizing unit" except that the surface of the rotating rotor which is in direct contact with the melt is deposited, by a plasma spraying process, with the layer 8 comprising a base layer of nickel metal and a top layer including tungsten carbide, tungsten, chromium, nickel composite and partially stabilized zirconia deposited sequentially one over another.

Each of the cylindrical portions 2b of these rotating rotors 2 is formed with the apertures 4 having a diameter of about 1.0 mm and which are about 5,000 in number (see FIG. 2). An arrangement is made to supply a gas stream, which is heated to high temperatures by a propane gas burner, downward from the delivery port 3 in an annular configuration concentric with the rotating rotor 2.

These two units are used to fiberize glass wool having the composition, % by weight, using aluminoborosilicates as a raw material:

$SiO_2$: 68 to 72%
$Al_2O_3 + B_2O_3$: 4 to 8%
$CaO + MgO$: 11 to 13%
$Na_2O + K_2O$: 15 to 17%
Others: 0 to 2%.

In either instance, the inorganic raw material has been melted by heating it to 1,400° C. in an electric furnace. The rotating rotor 2 has been driven at a number of revolutions of 3,000 rpm for a duration of 72 hours.

Fibers manufactured with the "first fiberizing unit" initially exhibited diameters from 2 to 14 $\mu$ at the start of the operation with a mean value of 10.1 $\mu$. However, after 72 hours of operation, the diameters of the fibers changed in a range of 2 to 16 $\mu$ with a mean value of 11.1 $\mu$, accompanying non-fiberized particles content of 3 to 5 percent by weight.

On the other hand, the fibers manufactured with the "second fiberizing unit" exhibited diameters in a range of 2 to 14 $\mu$ with a mean value of 10.2 $\mu$ and which did not change with the duration of operation. The content of non-fiberized particles remained at 0 percent.

While an embodiment of the invention and an example thereof have been described, it is found that with the apparatus of the invention, the deposited layer 8 is in direct contact with the molten inorganic raw material and insusceptible to erosion, while the rotating rotor is protected from such direct contact with the hot inorganic material and hot gas. Consequently, as compared with the prior art, an increased useful life of the rotating rotor is realized, and the short inorganic fibers, which are produced as a product, do not increase in diameter inasmuch as the inner diameter of the apertures do not increase. Accordingly, the quality of fibers, produced as a product, is improved and stablized. As mentioned previously, the inner surface of the apertures may also be coated with the deposited layer of the similar material, thereby completely preventing any increase in the diameter of the apertures. The gas which is jetted from the delivery port 3 may comprise a combustion gas that is obtained by burning a fuel, high speed air or steam heated to elevated temperatures or any other desired gas.

Figure 4:
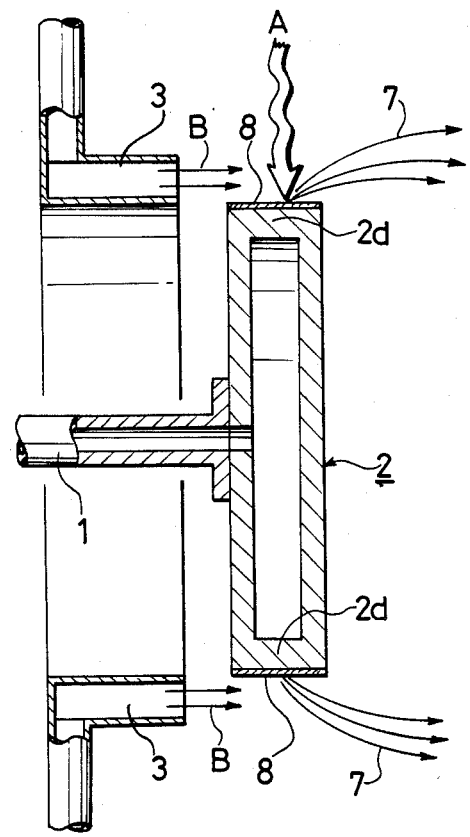
FIG. 4 is a longitudinal section similar to FIG. 1, illustrating another embodiment of the invention.

In the described embodiment, a number of apertures 4 have been formed in the rotating rotor 2, but the invention is feasible without the provision of such apertures. Such procedure may be employed to manufacture short fibers of rock wool, ceramic wool or the like. This is illustrated by another embodiment of the invention which is shown in FIG. 4. In this embodiment, the rotary shaft 1 is disposed horizontally, with a cylindrical rotating rotor 2 detachably mounted on one end of the shaft 1. The combination of the shaft 1 and the rotating rotor 2 are driven for rotation at high speed, as indicated by an arrow, by a drive source, not shown. The rotating rotor 2 may have a diameter from 100 to 500 mm and an axial length of cylindrical portion from 50 to 250 mm.

Figure 3:
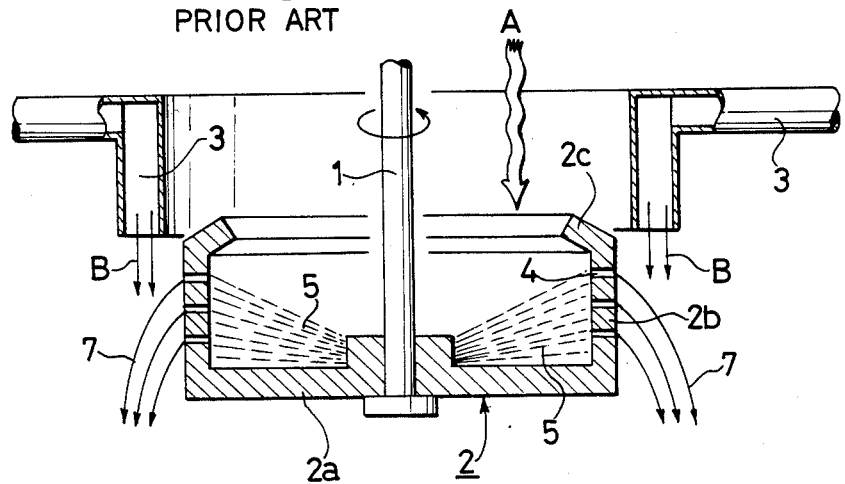
FIG. 3 is a longitudinal section similar to FIG. 1, but in which the rotating rotor is not coated with a deposited layer.

A gas stream delivery port 3, similar to that illustrated in FIGS. 1 and 3, are provided, and is disposed close to the outer periphery of the rotating rotor 2 to the left of a cylindrical portion 2d of the rotating rotor 2. As shown, the delivery port 3 is annular in configuration and is fixedly mounted. The delivery port 3 supplies a hot and high speed gas or a high speed gas in an annular configuration concentric with the revolving member 2 toward the cylindrical portion 2d, thereby blowing a melt off which is deposited on and rotates with the surface of the cylindrical portion 2d, thus fiberizing the dispersion thereof.

A deposited layer 8 is formed on that surface of the rotating rotor 2 which is adapted to be in contact with the melt, such as the outer surface of the cylindrical portion 2d, for example. The deposited layer 8 is similar to that mentioned in connection with the first embodiment.

In this embodiment, the rotary shaft 1 is disposed horizontally, but the shaft 1 may assume an inclined position. In addition, while a single rotating rotor 2 is mounted on the shaft 1, a plurality of rotating rotors, such as a four rotor system, may be mounted on each corresponding shaft. When manufacturing short inorganic fibers of rock wool or the like using such apparatus as shown in FIG. 4, a hot melt is fed onto the surface of the outer periphery of the cylindrical portion 2d of the rotating rotor 2 which rotates at a high speed, as indicated by an arrow A in FIG. 4. Thereupon, the melt is deposited and clings to the surface of the cylindrical portion 2d and rotates at high speed by the rotation of the rotating rotor 2. Since the rotating rotor 2 is surrounded by an annular gas stream B of a high speed, which is blown off approximately parallel with the axis of the rotating rotor, the melt is stretched to form thin fibers 7. It will be seen that since the deposited layer 8 is formed on the surface of the cylindrical portion 2d of the rotating rotor 2, such deposited layer 8, rather than the rotating rotor 2 itself, is in direct contact with the molten, hot inorganic raw material, whereby the rotating rotor is protected from direct contact with the hot material and thus is insusceptible to erosion by raw material. Accordingly, the surface of the cylindrical portion 2d cannot be eroded to result in an uneven surface. In this manner, an increased useful life of the rotating rotor 2 is achieved. Accordingly, if the rotating rotor 2 is operated over a prolonged period of time, it is assured that the melt will sufficiently cling to the rotating rotor 2 to result in a uniform distribution of diameters of the fibers produced as a product. In addition, an increase in the content of non-fiberized particles is avoided, thus enabling a uniform quality of the fiber product to be maintained.

While the invention has been described above in connection with several embodiments thereof, it should be understood that a number of changes, modifications and substitutions will readily occur to one skilled in the art from the disclosure given above without departing from the spirit and scope of the invention defined by the appended claims.

What is claimed is:

1. An apparatus for manufacturing short inorganic fibers comprising:

a rotating nickel-chromium steel rotor and a support means for supporting said rotating rotor for rotation at high speed, said rotor having a bottom and inner and outer cylindrical peripheral surfaces adapted to receive directly thereon a coating of a high temperature, erosion resistant coating material;

means defining a coating formed of a base layer of nickel metal and a top layer including tungsten carbide, tungsten, chromium, nickel composite and partially stabilized zirconia, said coating covering said bottom and inner and outer cylindrical peripheral surfaces on said rotating rotor, an outer surface of said coating material being adapted to receive directly thereon a molten inorganic raw material, said coating serving to protect said bottom and inner and outer cylindrical peripheral surfaces of said rotor from erosion caused by contact with said molten inorganic raw material; and a gas stream delivery port oriented so as to deliver high pressure gas to said port and across said outer cylindrical peripheral surface in an axial direction of said rotating rotor, said port encircling said support means supporting said rotating rotor and effecting a blowing away of melt from said coating on said outer cylindrical peripheral surface.

2. An apparatus according to claim 1 in which the high temperature, erosion resistant coating material is formed on the surfaces of the rotor by a plasma spraying process.

3. An apparatus according to claim 1 in which the coating which is coated on the surfaces of the rotor has a thickness equal to or greater than 70 $\mu$.

* * * * *